No. 626,403. Patented June 6, 1899.
D. G. BAKER.
BOBBIN WINDER.
(Application filed Jan. 24, 1895.)
(No Model.) 8 Sheets—Sheet 1.

No. 626,403. Patented June 6, 1899.
D. G. BAKER.
BOBBIN WINDER.
(Application filed Jan. 24, 1895.)
(No Model.) 8 Sheets—Sheet 3.

Witnesses:
J. A. Cantin
A. B. Jenkins

Inventor:
Dickerson G. Baker
by Chas. L. Burdett,
Attorney

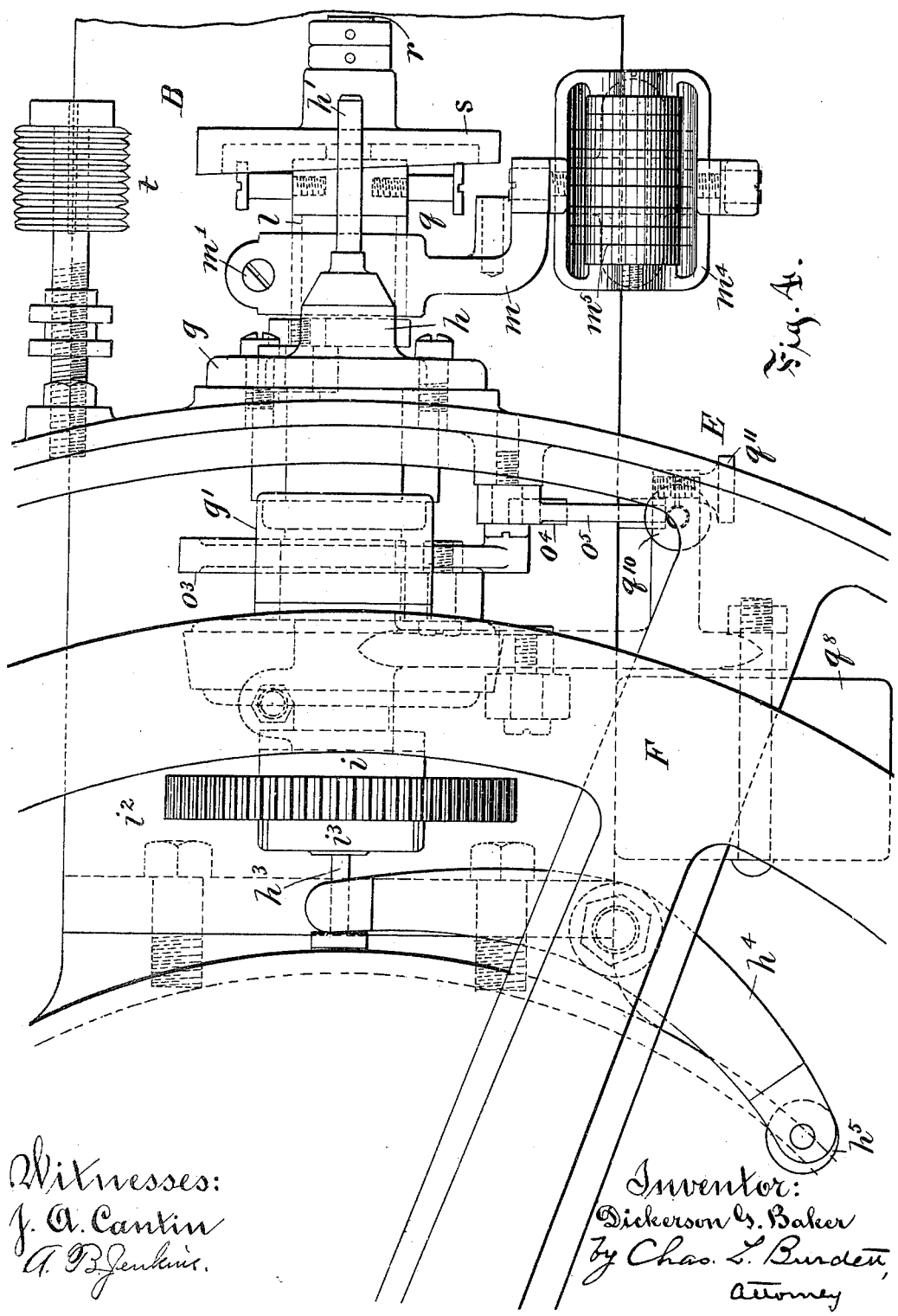

No. 626,403. Patented June 6, 1899.
D. G. BAKER.
BOBBIN WINDER.
(Application filed Jan. 24, 1895.)
(No Model.) 8 Sheets—Sheet 5.
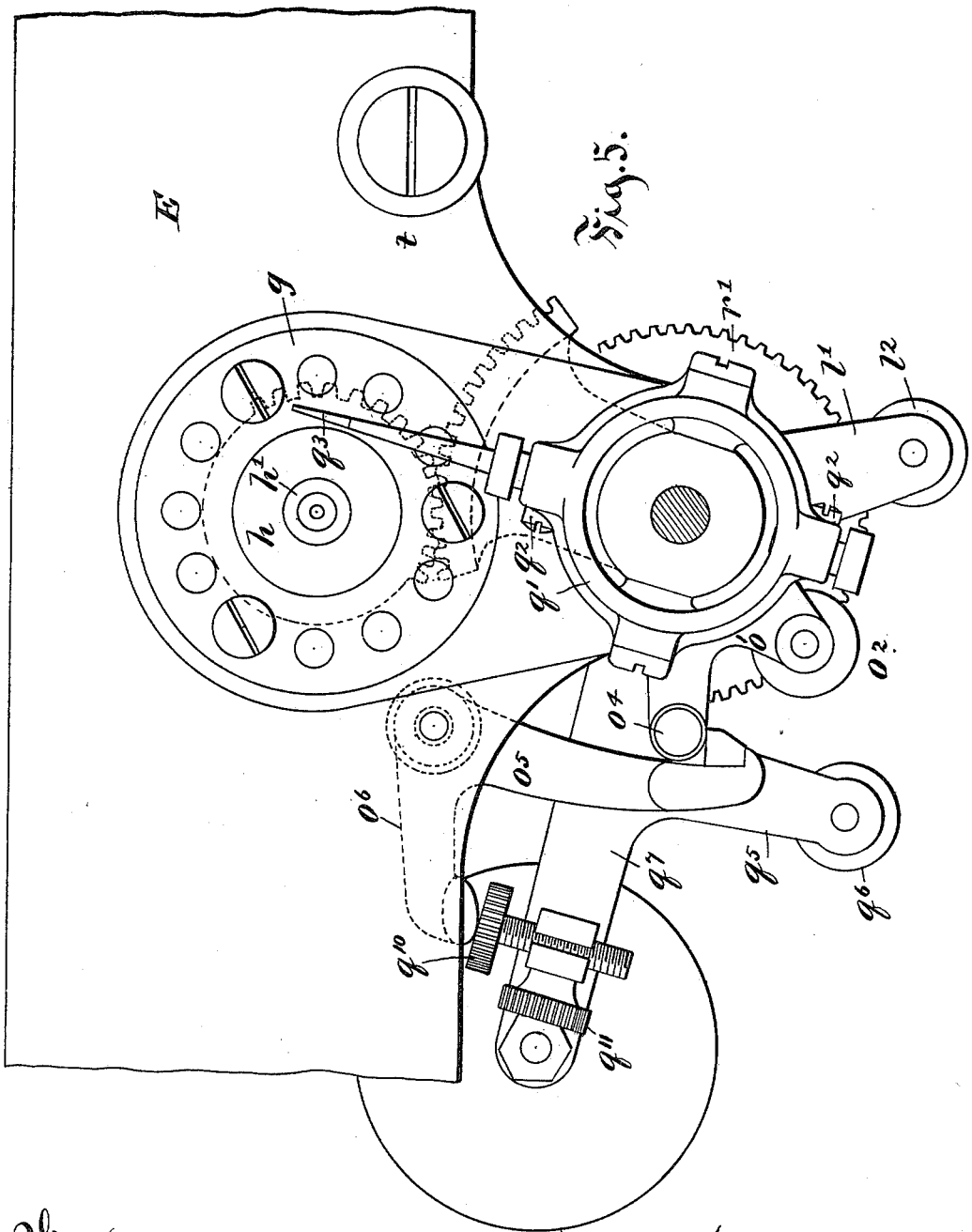
Witnesses:
J. A. Cantin
A. B. Jenkins
Inventor:
Dickerson G. Baker
by Chas. L. Burden,
Attorney No. 626,403. Patented June 6, 1899.
D. G. BAKER.
BOBBIN WINDER.
(Application filed Jan. 24, 1895.)
(No Model.) 8 Sheets—Sheet 6.
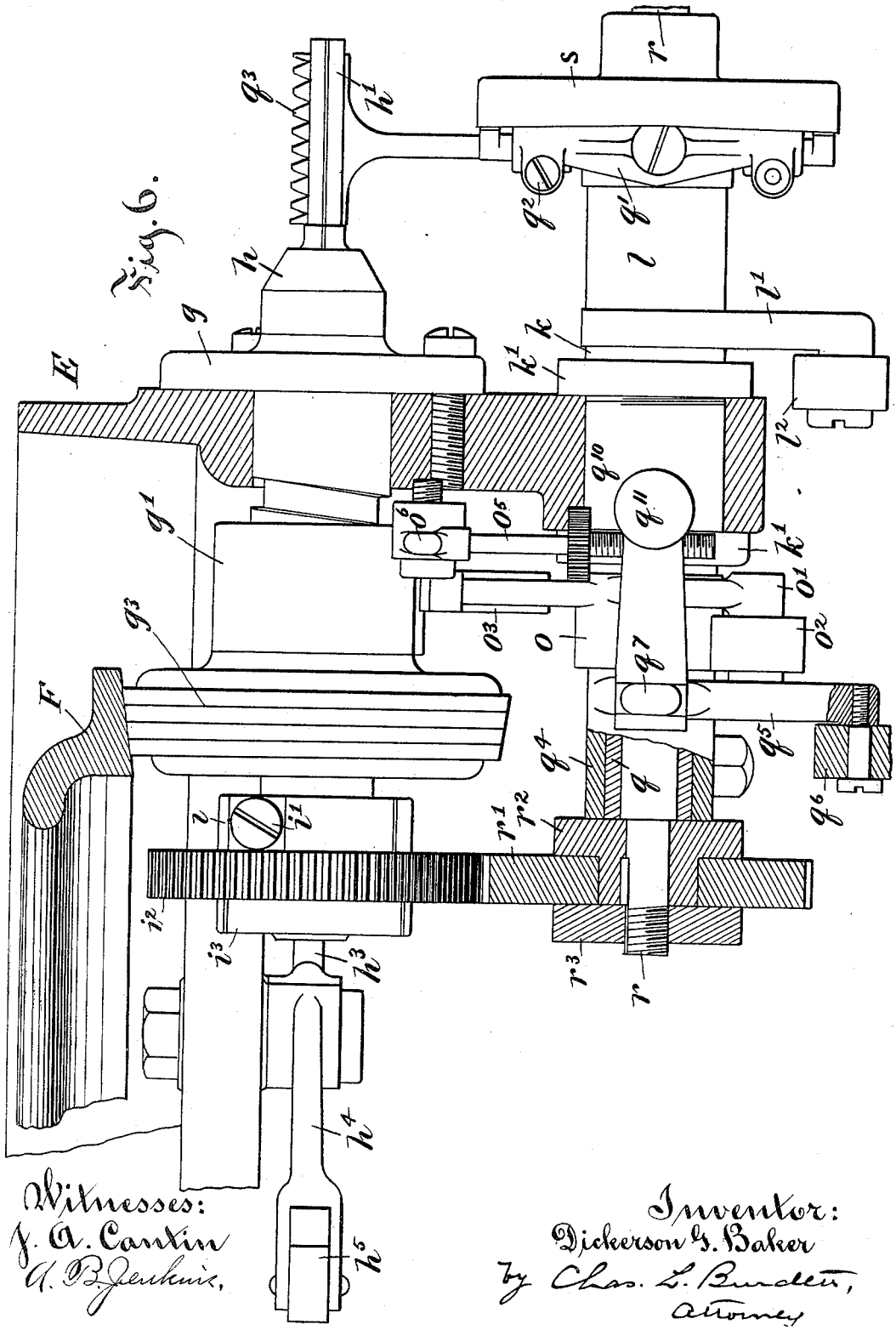

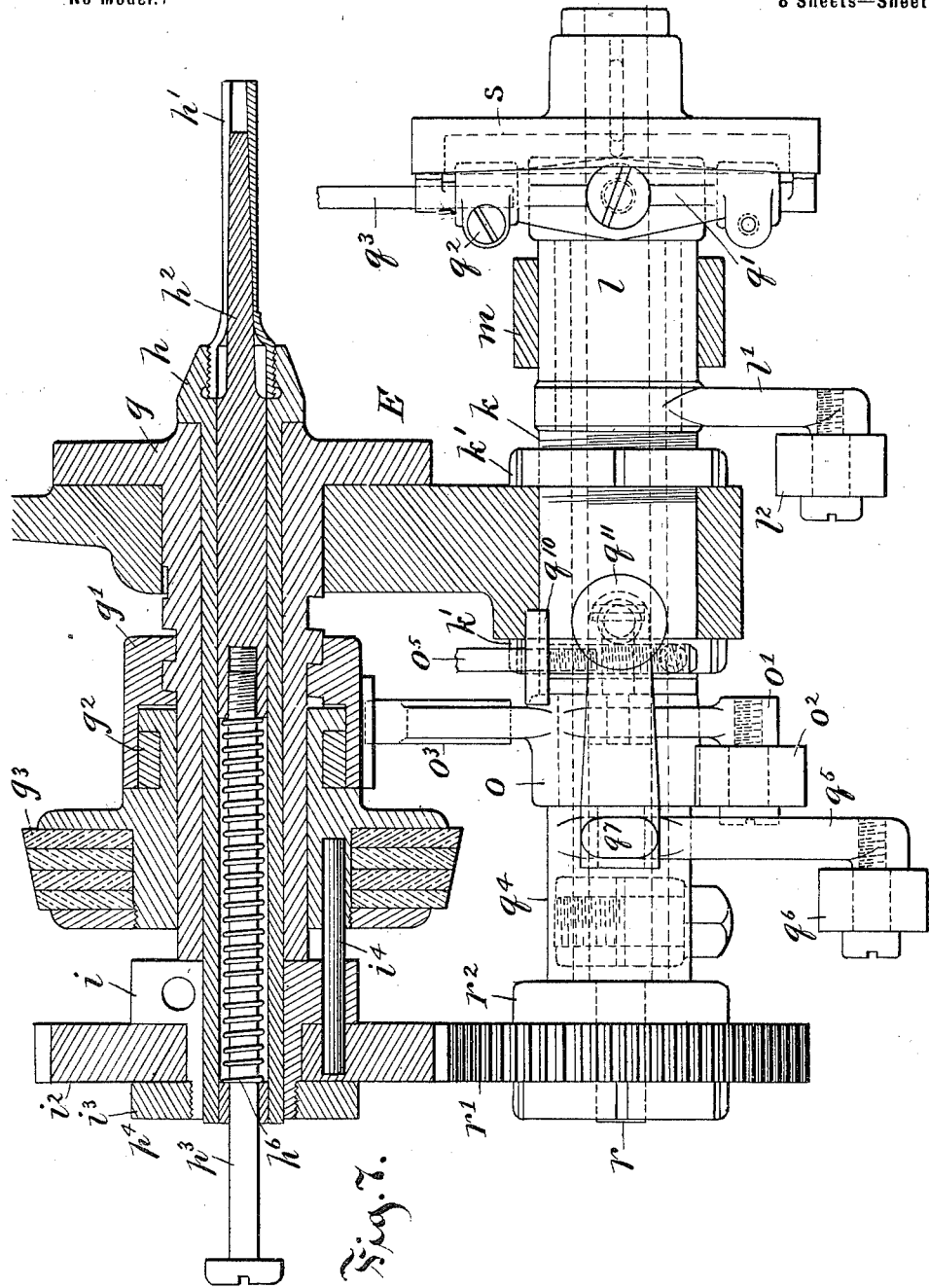

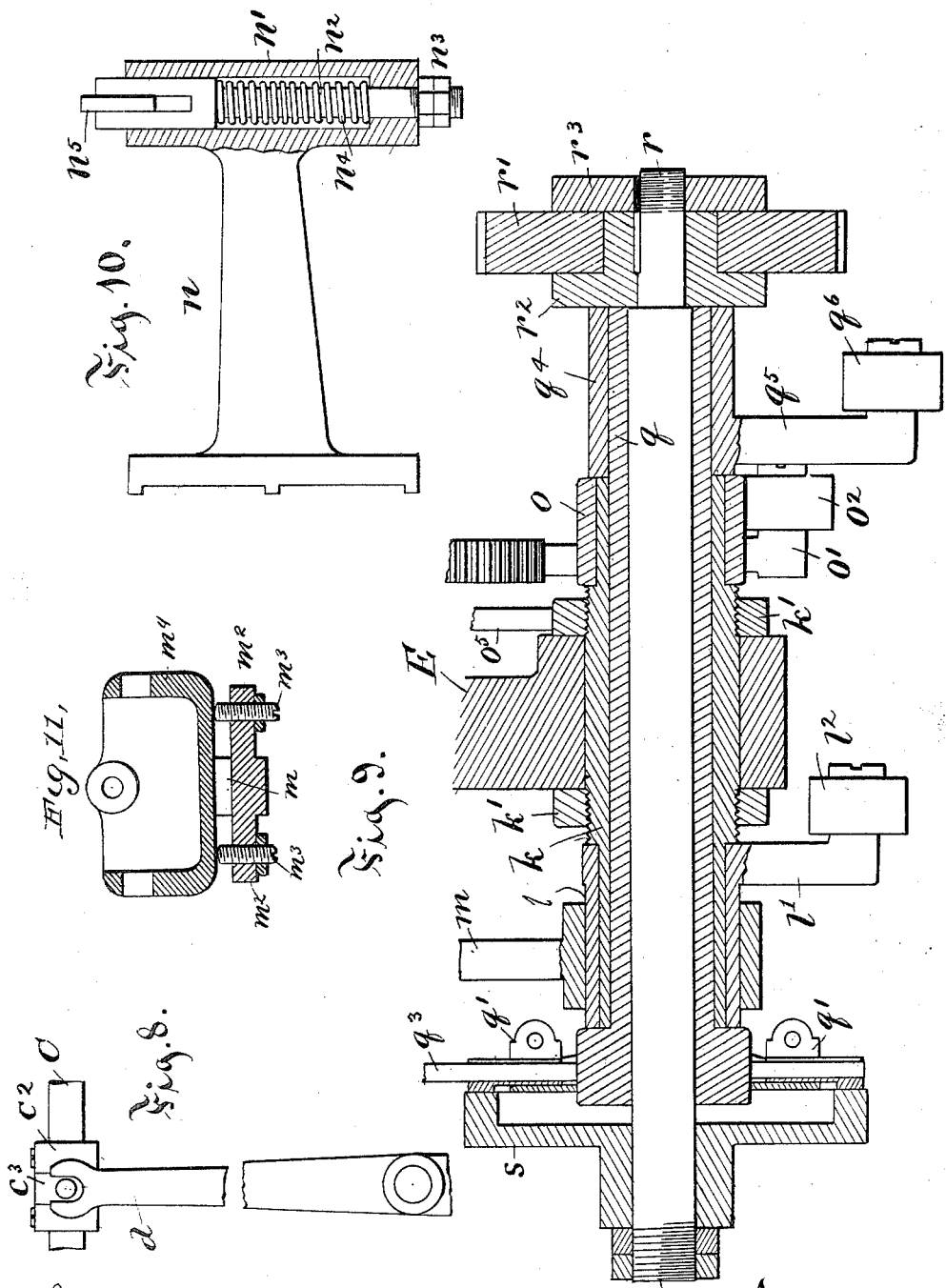

UNITED STATES PATENT OFFICE.

DICKERSON G. BAKER, OF WILLIMANTIC, CONNECTICUT, ASSIGNOR TO THE WILLIMANTIC LINEN COMPANY, OF SAME PLACE.

BOBBIN-WINDER.

SPECIFICATION forming part of Letters Patent No. 626,403, dated June 6, 1899.

Application filed January 24, 1895. Serial No. 536,128. (No model.)

*To all whom it may concern:*

Be it known that I, DICKERSON G. BAKER, a citizen of the United States, and a resident of Willimantic, in the county of Windham and State of Connecticut, have invented certain new and useful Improvements in Bobbin-Winders, of which the following is a full, clear, and exact description, whereby any one skilled in the art can make and use the same.
The object of my invention is to provide a machine on which a large number of bobbins may be wound under the supervision of a single operative, the machine being for the larger part automatic in its operation; and to this end my invention consists in a machine embodying the several novel features herein set forth, in the details of the parts, and in the combination of said parts making up the machine as a whole, as more particularly hereinafter described, and pointed out in the claims.

Figure 1:
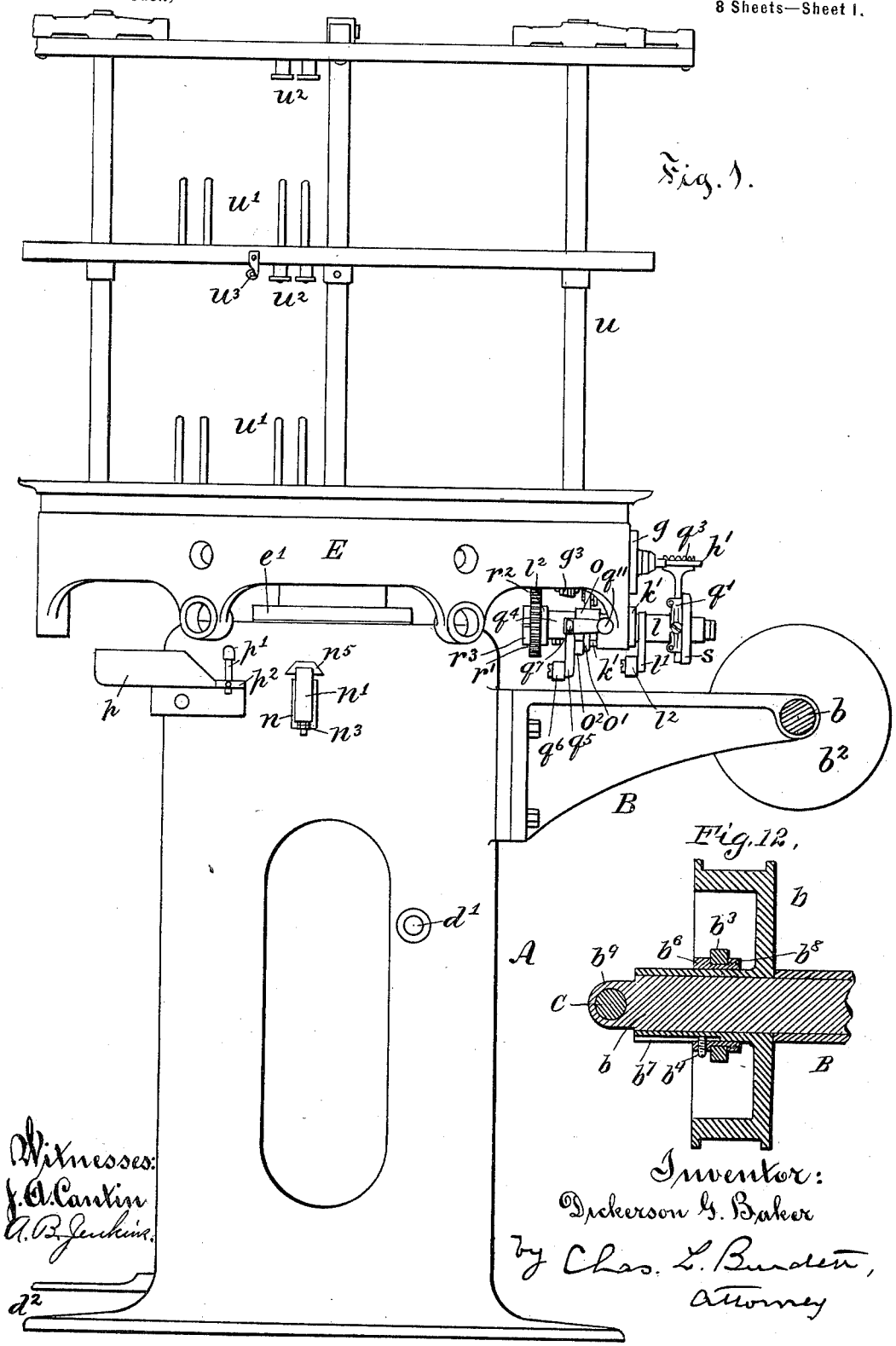
Figure 2:
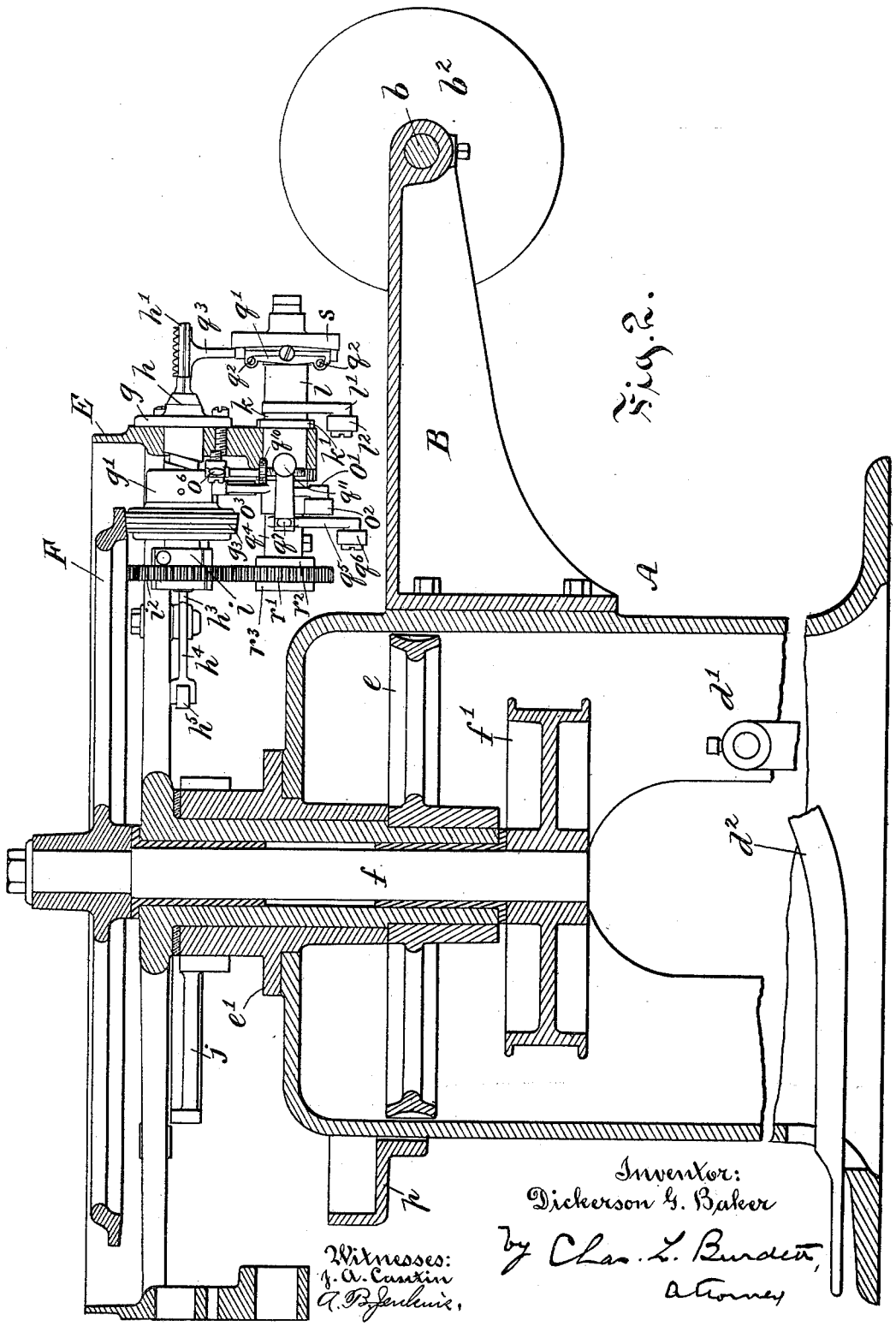
Figure 3:
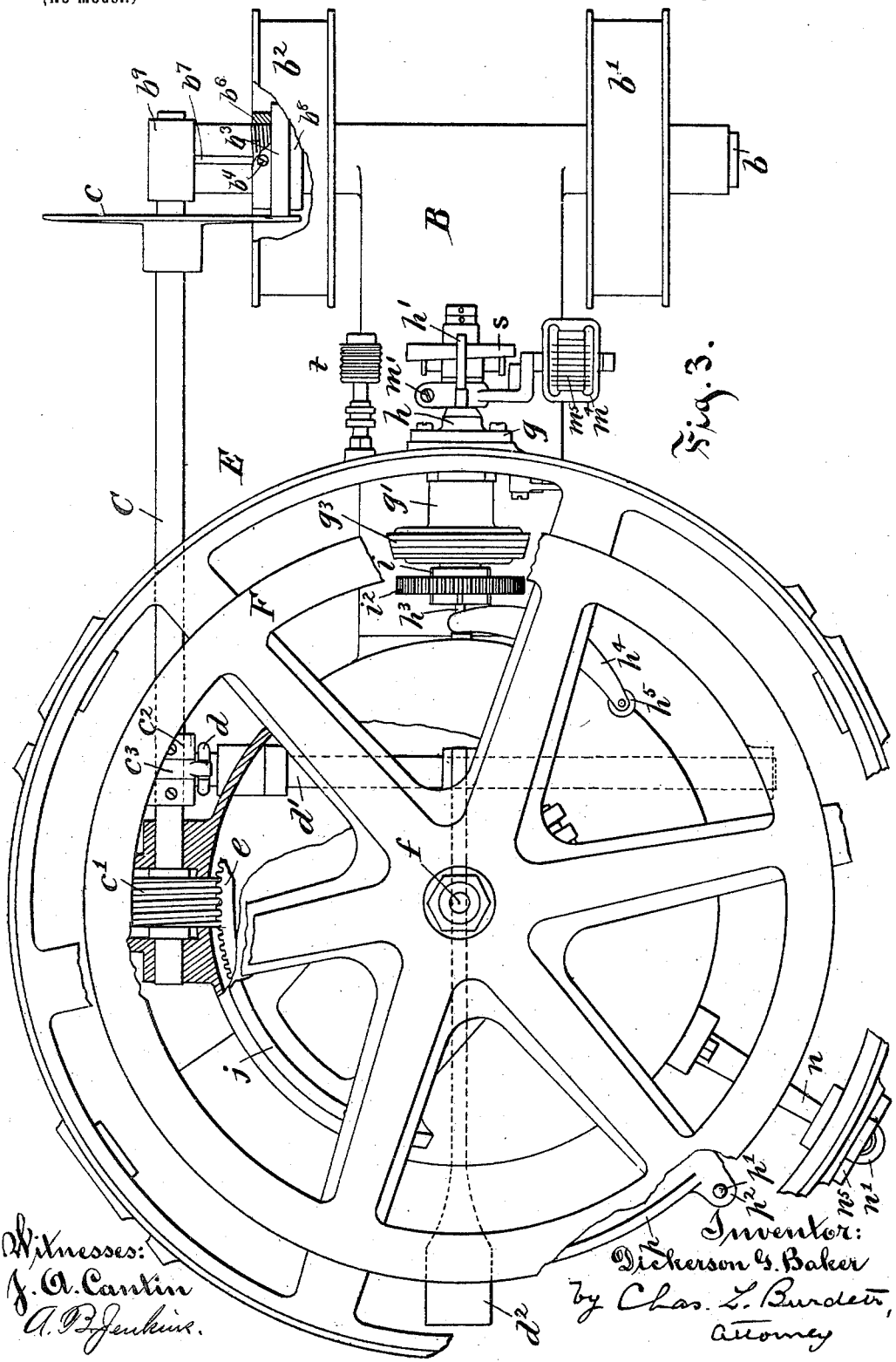

Referring to the drawings, Figure 1 is a side view of a machine embodying my improvements, the cutter-arm being removed.
Fig. 2 is a detail side view, on enlarged scale, in central vertical section, through the lower part of the machine with cutter-arm removed. Fig. 3 is a detail top or plan view, on enlarged scale, of the lower part of the machine, partly in section and with parts broken away to show construction, guide removed. Fig. 4 is a detail top or plan view, on enlarged scale, of a portion of the turret, showing the winding-head attached thereto, the guide being removed. Fig. 5 is a detail end view of a winding-head and of a portion of the turret, the cutter and cam being removed and the starting mechanism shown in position to cause the rotation of the winding-spindle. Fig. 6 is a detail side view, partly in section, of the winding-head. Fig. 7 is a detail side view, on enlarged scale, in central section, of the bobbin-spindle and in side view of the cam-spindle. Fig. 8 is a side view showing the connection between the worm-shaft and rock-shaft. Fig. 9 is a view in cross-section of the cam-spindle with the cutter-arm broken off and looking in an opposite direction from the plan view of Figs. 6 and 7. Fig. 10 is a detail view, in central section, through the cutter-cam. Fig. 11 is a detail view showing the means of adjustment of the cutter-shell. Fig. 12 is a detail view, in vertical section, through the friction-roll and parts connected therewith.

In the accompanying drawings the letter A denotes the standard or base of a machine that may be composed of any suitable material and of any desired form. To this base, preferably at the rear side, is secured a bracket B, in which is mounted a stud $b$. Carrying-pulleys $b'$ $b^2$ are mounted on this stud $b$, and to the hub of the pulley $b^2$ is adjustably secured a collar $b^6$. A set-screw $b^4$ extends through this collar into a groove $b^7$, extending lengthwise along the hub, this providing means for the adjustment of the collar on said hub. This collar $b^6$ is shouldered and supports a friction-roll $b^3$, resting against the shoulder, the end of the collar opposite the shoulder being threaded for the reception of a nut $b^8$, this nut holding the friction-disk securely in place. An end of the stud $b$ is enlarged, as at $b^9$, in which is formed a journal for the worm-shaft C. (See Fig. 12 of the drawings.) This worm-shaft bears a friction-disk $c$, secured thereto, and a worm $c'$, splined to the worm-shaft in such manner as to allow the latter to have a free lengthwise movement in the worm, but compelling the two to rotate together. Two collars $c^2$ are also secured to the worm-shaft to rotate therewith, and a studded collar $c^3$ is mounted on the shaft between the collars $c^2$, the worm-shaft rotating freely in this studded collar. The studded collar $c^3$ is in engagement with the end of a forked lever $d$, the lower end of which is secured to a rock-shaft $d'$, journaled in the standard A. There is also secured to this rock-shaft a treadle $d^2$. By this construction of parts a rocking movement of the treadle $d^2$, which may be obtained by the foot of the operative, causes the worm-shaft C to be moved longitudinally and the friction-disk $c$, borne thereon, to be thrown into or out of engagement with the adjustable friction-roll $b^3$.

The worm $c'$ on the worm-shaft C is in mesh with a driving-gear $e$, secured to a hollow shaft of a turret E. This turret is preferably circular in form and is located above the standard or base, the shaft of the turret in the form shown being mounted in a flanged sleeve $e'$, secured to the base A.

A driving-pulley $f'$ is secured to the lower end of the driving-shaft $f$, and to the upper end of this driving-shaft is secured the driving-wheel F. A belt driven from any suitable source of power passes downward, engaging each of the carrying-pulleys $b' b^2$, and around the driving-pulley $f'$, the latter imparting movement to the mechanism of the winding-head, and the pulley $b^2$, through connecting mechanism, causing the turret E to be rotated.

A number of winding-heads are secured to a downturned flange of the turret E at suitable distances apart. These winding-heads are each composed of mechanism, as follows:

A flanged sleeve $g$ extends through the flange of the turret from the outside and is secured therein, as by means of screws passing through the flange on the sleeve into the turret. This sleeve bears a coarse screw-thread, and a shipper-nut $g'$ is mounted on the flanged sleeve $g$ and has an interior screw-thread meshing with the thread on said sleeve, so that a slight turn of the shipper-nut causes it to be moved a considerable distance on said sleeve. A collar $g^2$ is secured to the shipper-nut $g'$ and rests in a groove in the driven friction-wheel $g^3$. The surface of the shipper-nut is toothed, the preferred form consisting of a segment only, as shown in the drawings. This driven friction-wheel bears disks of any suitable material, as leather, secured between flanges on the wheel, and they are preferably beveled to engage the beveled under surface of the driving-wheel F. It will be seen from this construction that a slight rotation of the shipper-nut $g'$ will give to the driven friction-wheel an endwise movement and cause it to be thrown into or out of engagement with the driving-wheel F. A winding-spindle $h$ extends lengthwise through the sleeve $g$ and has a tip $h'$ secured to its front end. This tip is hollow and slitted lengthwise, the hole in this tip being tapered and larger at the rear than at the front end. A tapered expander $h^2$ extends within this tip and is located in the winding-spindle $h$, and to the rear end of this expander is secured, as by means of interengaging screw-threaded parts, a withdrawing-rod $h^3$. A spiral spring $h^6$ is located in a chamber within the spindle $h$, one end of the spring thrusting against the expander $h^2$ and the opposite end against a wall of the chamber, the withdrawing-rod $h^3$ extending through this spring, the function of the spring being to tend normally to thrust the expander into the tip $h'$ and expand the latter.

The outer end of the withdrawing-rod $h^3$ is headed, as shown in the drawings, and engages the end of the withdrawing-lever $h^4$, pivoted on the under side of the turret E. The withdrawing-lever is preferably provided on one end with a roller $h^5$, that engages a cam to be hereinafter described. A friction-collar $i$ is secured to the end of the winding-spindle $h$ and is secured thereto, as by means of the screw $i'$. A spindle-gear $i^2$ is secured to the collar $i$, a nut $i^3$ holding the gear in place. A pin $i^4$ extends from the driven friction-wheel $g^3$ through the collar $i$ and into the spindle-gear $i^2$, and as the friction-wheel is rotated the collar and gear are turned, and consequently the winding-spindle $h$, which is secured to the friction-collar $i$.

It is to be noted that the construction of the meeting surfaces of the driven friction-wheel $g^3$ and the driving-wheel F on a bevel tends normally to thrust the two apart.

A withdrawing-cam $j$ is located on the machine in proper position to engage the withdrawing-lever $h^4$ and withdraw the expander at a time when it is desired to place a paper shell to be cut into bobbins on the tip $h'$. In the form shown this cam is secured to the flanged collar $e'$ and is extended to the front of the machine, this being the preferable position of the winding-heads at the time of placing the paper shell on the tip $h'$, and as the winding-heads are revolving past this point the expander is withdrawn from the tip by the mechanism described.

A quill $k$ is secured in an opening in the lower edge of the flange of the turret E, the outer surface being screw-threaded and bearing nuts $k'$ on each side of the flange of the turret E. This construction allows for a longitudinal adjustment of the quill within the flange.

A cutter-bushing $l$ is loosely mounted on the quill $k$ outside of the flange of the turret E and has a cutter-operating arm $l'$ preferably integral therewith. A roller $l^2$ is rotatively mounted on a screw-stud secured to this arm. A cutter-holder $m$ is secured to the cutter-bushing $l$, preferably by clamping, as shown in the drawings, the shank of the holder being split, and a screw $m'$ is used to clamp the cutter-holder about the bushing $l$. The outer end of this cutter-holder is curved and bears lateral arms $m^2$, in which are located adjusting-screws $m^3$.

A cutter-shell $m^4$ is pivoted in the outer ends of the curved portion of the cutter-holder, with the back of the shell resting against the adjusting-screws $m^3$. A tube-cutter $m^5$ is mounted in the cutter-shell $m^4$, so as to rotate therein. A cutter-cam bracket $n$ is secured to the standard A of the machine and extends laterally therefrom and has a tubular portion $n'$ on its outer end. A plunger $n^2$ is located in the tubular portion of the cutter-cam bracket, extending therethrough and bearing nuts $n^3$ on the lower end. A spring $n^4$ is also located in the cutter-cam bracket, one end resting on the bottom of the chamber within the bracket and the upper end thrusting against a shoulder on the plunger. A cam-plate $n^5$ is secured to the upper end of the plunger and is preferably beveled on its opposite ends. This cam-plate on the cutter-cam bracket is located in proper position at one side of the front of the machine to engage the roller $l^2$ on the operating-arm $l'$ and thrust the tube-cutters $m^5$, borne in the cutter-holder $m$, against a paper tube that has been placed on the tip $h'$ of the winding-spindle and sever the tube into several sections. The construction described provides a yielding cam upon which the roller $l^2$ rides, so that in case any obstruction is placed in the path of movement of the tube-cutters the plunger bearing the cam-plate will yield and allow the roller to ride over the cam without forcing the cutters upward. A stop-motion $o$ is also borne on the quill $k$, inside of the flange on the turret E. This stop-motion has an arm $o'$ extending therefrom, the outer end of the arm bearing a roller $o^2$, mounted on a screw-stud secured to the arm. A segment $o^3$ is also located on the stop-motion, projecting on the opposite side from the arm $o^2$ and in engagement with the segment on the shipper-nut $g'$. A stop-motion stud $o^4$ is also secured to the stop-motion and is adapted to engage the lower end of a latch $o^5$, pivoted to the flange of the turret E. This latch has an arm $o^6$, the purpose of which will be hereinafter described. It will be seen from the construction of this latch that its lower end will be held normally in engagement with the stop-motion stud $o^4$ by gravity. The stop-motion is rocked to one side as the roller $o^2$ on the arm $o'$ comes in contact with the starting-pin $p'$, located in a projection $p^2$ on the lifter-cam $p$. As this stop-motion is rocked to one side the segment $o^3$ is also rocked, causing the shipper-nut to be rotated on the flanged sleeve $g$ and forced along said sleeve by means of the interengaging screw-threaded parts bringing the driven friction-wheel $g^3$ into contact with the driving-wheel F and setting the winding-spindle in motion. As the arm $o'$ is thrown upward the latch $o^5$ engages the stop-motion stud $o^4$ and holds the stop-motion in this position until it is disengaged by means hereinafter described, the winding-spindle continuing to rotate when the stop-motion is in this position.

A lifter-sleeve $q$ extends through the quill $k$, projecting on each end, and on the outer and larger end of this sleeve is pivoted an oscillator $q'$. This oscillator is preferably made in two parts, as shown in the drawings, held together by screws $q^2$, passing through flanges on the two parts. A guide $q^3$ is adjustably secured to this oscillator and extends on one side of the tip $h'$ of the spindle $h$. A lifter $q^4$ is secured to the opposite end of the lifter-sleeve $q$ from that on which the oscillator is located, and a lifter-arm $q^5$ extends from the lifter and bears a roller $q^6$. A knock-off arm $q^7$ also extends from the lifter $q^4$, the outer end of this arm bearing a weight $q^8$, tending to hold the arm in a downward position. A stop-screw arm extends from the knock-off arm $q^7$, the outer end of this arm bearing an adjustable stop-screw $q^{10}$. The end of this stop-screw arm is preferably split, as shown in the drawings, a clamp-screw $q^{11}$ being located therein and used to clamp the stop-screw $q^{10}$ in any desired position of adjustment. This stop-screw $q^{10}$ is so located that in its swinging movement it encounters the end of the arm $o^6$ of the latch $o^5$, and thus disengages the latch from the stop-motion stud $o^4$. This operation relieves the pressure of the driven friction-wheel $g^3$ on the driving-wheel F, and the rotation of the former tends to throw the shipper-nut $g'$ backward on the thread on the spindle-bushing $g$, and thus stop the rotation of the spindle $h$. The weight $q^8$, through the medium of the connected mechanism, including the lifter-sleeve $q$, causes the guide $q^3$ to be held normally in contact with the tip $h'$ on the winding-spindle $h$ or a bobbin or bobbins located thereon, and in the winding operation as this bobbin increases to the desired size the guide is thrown outward by this increase in size of the bobbin, rotating the lifter-sleeve and lifting mechanism connected thereto, causing the stop-screw $q^{10}$ to be thrown into contact with the arm $o^6$ of the latch $o^5$ and disengage it from the stop-motion stud $o^4$, as described.

A cam-spindle $r$ extends lengthwise through the lifter-sleeve $q$, a cam change-gear $r'$ being secured to the inner end of the spindle. In the form shown a bushing $r^2$ is keyed to the end of the spindle $r$, and a nut $r^3$ is used to hold the gear in place on the bushing. A traverse-cam $s$ is secured to the opposite end of the cam-spindle $r$, a cam-surface $s'$ being located on the side of the cam. The guide $q^3$ is held normally in contact with this cam-surface, and as the cam is rotated the guide is given a swinging movement in line with the axis of the cam-spindle.

A lifter-cam $p$ is located on the standard A of the machine, preferably at the front and in a position to engage the roller $q^6$ on the lifter-arm $q^5$ and through the medium of the lifter-sleeve hold the guide $q^3$ away from the tip $h'$ of the winding-spindle $h$ during the time that the operative of the machine is placing a tube on the tip on which bobbins are to be wound and while the threads are being properly secured to this tube.

A tension $t$ is secured to the outside of the flange on the turret E, opposite the guide $q^3$. This tension may be of any well-known form and construction, and a further description herein is deemed unnecessary.

A creel $u$ is placed on the upper part of the turret E and is provided with a number of pins $u'$, on which spools are placed for supplying thread to the winding-head, a number of these pins being placed adjacent to and over each of the winding-heads. The thread passes from the bobbin upward through a tension device $u^2$ and through a guide $u^3$ and thence downward to the tension $t$ at the side of the turret. This creel forms no part of the invention except in the general combination, and a further and detailed description is deemed unnecessary herein.

The cam $s$ preferably used with this machine is so constructed that it has one rise and one fall, the rise and fall being regular—that is, starting from the lower surface or fall of the cam a gradual rise is made until the highest point is attained, which occurs in just a half-revolution of the cam, and then the cam gradually falls way to the lowest point. In this construction the guide $q^3$ is given a movement to and fro in one rotation of the cam, forming what is known as a "two-traverse" bobbin—that is, the thread traverses or crosses the bobbin twice in one rotation of the cam. The winding-gear spindles are so constructed that the change-gears $i^2$ and $r'$ can be readily reversed or replaced by gears of a different size, in the form shown in the drawings the gears being of the same size and the cam-spindle and winding-spindle rotating practically at the same rate of speed, except as hereinafter described, thus producing, as before stated, a two-traverse bobbin. In order to produce a single-traverse bobbin, the size of the gears are changed so that that on the cam-spindle shall be twice as large as the gear on the winding-spindle, and to produce a four-traverse bobbin these gears are reversed, the gear on the cam-spindle being half the size of the gear on the winding-spindle.

In order to cause that portion of the thread being wound on the bobbin to be laid back and close to that length just previously placed on the bobbin, I provide means whereby the cam on the cam-spindle travels relatively slower than does the winding-spindle, this causing the guide to also travel slightly slower. This is accomplished by constructing the change-gear $r'$ with a less number of teeth than that contained in the change-gear $i^2$, the difference preferably being one tooth less in the gear $r'$ than in the gear $i^2$. This does not perceptibly affect the running of the parts, and the construction, as stated, causes the guide to travel relatively slower than does the winding-spindle, with the result that a portion of the thread being wound on the bobbin is not caused to ride upon or overlie that length of the thread just previously placed on the bobbin in its rotation.

It is to be noted that a single winding-head has been described herein. Any number, however, may be used on the turret, as desired, they being all constructed as above described.

The operation of a single winding-head on the device is as follows: The different parts of the device being in the position shown in the drawings, the driven friction-wheel $g^3$ is in contact with the driving-wheel F and the stop-screw $q^{10}$ in engagement with the arm $o^6$ of the latch $o^5$ and the turret rotated by reason of the engagement of the friction-disk $c$ with the friction-roll $b^3$. As the bobbin continues to increase in size by the rotation of the winding-spindle $h$ the guide $q^3$ is thrown still farther to one side, rotating the lifter-sleeve $q$ and the stop-screw $q^{10}$, connected thereto. This throws the latch $o^5$ out of engagement with the stop-motion stud $o^4$, secured to the stop-motion $o$. This relieves the pressure of the driven friction-wheel $g^3$ on the driving-wheel F, and the friction-wheel is moved along the sleeve $g$, causing the shipper-nut $g'$ to be turned on the thread on the sleeve and swing the stop-motion to one side in a position opposite to that shown in Fig. 5 of the drawings. The slight frictional contact between the collar $g^2$ on the shipper-nut $g'$ and the driven friction-wheel $g^3$ aids in this movement of the parts on the sleeve $g$. The operation just described stops the rotation of the winding-spindle and of all parts connected therewith. As the turret continues to revolve the roller $h^5$ on the withdrawing-lever $h^4$ engages the withdrawing-cam $j$, swinging the lever on its pivot, and by means of the interengaging parts withdraws the expander $h^2$ from the tip $h$ and allows the latter to contract, so that the bobbins which have been wound thereon may be easily removed. As this winding-head is presented to the operative in the rotation of the turret the several threads used in winding the several bobbins on a single head are cut by hand, the bobbins removed, and a single paper tube placed on the tip $h'$. An incision is made in one end of the tube and the ends of the thread clamped therein. As the turret continues to revolve the withdrawing-lever $h^4$ is released from engagement with the withdrawing-cam $j$ and the tapered expander $h^2$ is forced into the tip $h'$ under the impulse of the spring $h^6$, expanding the tip and clamping the paper tube firmly thereto. At about the same time that the expander is withdrawn from the tube by the mechanism described the roller $q^6$, connected with the lifter $q^4$, engages the lifter-cam $p$, causing the lifter-sleeve $q$ through the connected parts to be rotated, and consequently the guide $q^3$, secured to the outer end of the sleeve. This throws the guide away from the tip $h'$ and leaves the latter free, so that the paper tube may be readily placed thereon. As the turret continues to revolve the roller $o^2$ on the stop-motion arm $o'$ comes in contact with the starting-pin $p'$ on the lifting-cam $p$, causing the stop-motion to be swung over to the position shown in Fig. 5 of the drawings, when the stud $o^4$ engages the latch $o^5$. This movement of the stop-motion rotates the shipper-nut $g'$, causing it to move along the sleeve $g$, and forces the driven friction-wheel $g^3$ into contact with the driving-wheel F, thus causing the winding-spindle and parts connected therewith to be put in operation. At about the time that the roller $o^2$ on the stop-motion $o$ engages the starting-pin $p'$ to set the winding-spindle in motion, or just previous thereto, the roller $q^6$ on the lifter $q^4$ is released from the lifting-cam $p$ and the lifter is forced downward under the impulse of the weight $q^8$, this through the connected mechanism causing the guide $q^3$ to be thrown over against the paper tube that has been placed on the tip $h'$. At a time just after the winding-spindle has been set in motion the roller $l^2$ on the operating-arm $l'$ comes in contact with the cam-plate $n^5$, causing the cutter-bushing $l$ to be rotated, this bringing the tube-cutters $m^5$ into contact with the revolving paper shell, the knives being located to engage the shell in open spaces left between the several bobbins being wound on the shell. This severs the shell into several sections, and the roller $l^2$ is immediately released from the cam-plate $n^5$ and the tube-cutters thrown backward to their normal position. The turret continues to revolve until the several operations just described are again repeated. If the operative finds that the turret is revolving too fast to allow the bobbin to be removed, a new tube placed on the tip $h'$, and the threads connected therewith, a pressure on the treadle $d^3$ rotates the rock-shaft $d'$ and throws the worm-shaft $c$, connected with the rock-shaft, lengthwise away from the friction-roll $b^3$, this stopping the rotation of the turret. A belt from any suitable source of power passes downward and around the driving-pulley $f'$, engaging at a point between the source of power and the pulley $f'$ the periphery of each of the carrying-pulleys $b'$ and $b^2$. The rotation of the pulley $b^2$, through the medium of the friction-disk $c$, worm-shaft C, and worm $c'$, rotates the driving-gear $e$, and consequently the turret connected therewith. The adjustability of the friction-roll $b^3$, as described, causes it to be carried toward or away from the center of the friction-disk $c$, thus varying the speed at which the latter will be turned.

I claim as my invention—

1. In a winding-machine in combination, a base, a rotatable turret mounted on the base, means for rotating the turret, a winding-spindle borne on the turret and supporting means for clamping a tube thereon, a series of tube-cutters mounted in operative relation to the winding-spindle, means for holding said cutters in contact with the rotating bobbin-tube whereby the latter is separated into a number of parts each appurtenant to a bobbin, means for moving the tube-cutter into and out of operation, a guide supported in operative relation to the spindle and controlling the movement of several threads each appurtenant to a separate bobbin, and means for driving the spindle and operating the guide and the cutters, all substantially as described.

2. In a winding-machine, in combination, a base, a rotatable turret mounted on the base and having a downturned flange, a driving-wheel supported on the base and within the turret, a winding-spindle supported in bearings in the flange of the turret, a friction driving-pulley fast to the spindle, means for clamping a bobbin-tube on the spindle, a tube-cutter borne in operative relation to the spindle, means for moving said cutter into and out of contact with the bobbin-tube, and means for rotating the turret, and the driving-wheel, all substantially as described.

3. In a winding-machine, in combination with a revoluble turret bearing a number of winding-heads, a sleeve-shaft secured to the turret, a worm-gear secured to the sleeve-shaft, a worm in engagement with the worm-gear, a worm-shaft secured to the worm to rotate therewith but having a longitudinal movement therein, a driving-wheel secured to the worm-shaft, means for rotating the driving-wheel, a rock-shaft connected with the worm-shaft, and a treadle secured to the rock-shaft whereby the driving-wheel on the worm-shaft is thrown into and out of engagement with its driving means, all substantially as described.

4. In a winding-machine, in combination with a turret bearing a number of winding-heads, a sleeve-shaft secured to the turret, a worm-shaft operatively connected with the sleeve-shaft, a friction-disk secured to the worm-shaft, a friction-roll borne in operative relation to the friction-disk, means for adjusting the friction-roll toward and from the center of the friction-disk, and means for driving the friction-roll, all substantially as described.

5. In combination in a winding-machine, a turret bearing a number of winding-heads, a sleeve-shaft secured to the turret, a worm-shaft operatively connected with the sleeve-shaft, a friction-disk secured to the worm-shaft, a friction-roll secured to the hub of a carrying-pulley and in engagement with the working surface of the friction-disk, and the carrying-pulley, all substantially as described.

6. In a winding-machine, in combination with a revoluble turret, a driving-wheel, means for rotating the driving-wheel, a spindle supported by the turret, a friction-wheel secured to the spindle, a threaded sleeve bearing the spindle, a shipper-nut loosely connected with the friction-wheel and in engagement with the screw-thread on the sleeve and bearing on its outer surface gear-teeth, a swinging segment in engagement with the teeth on the shipper-nut, and means for swinging the segment, all substantially as described.

7. In a winding-machine, in combination with a revoluble turret, a driving-wheel, means for rotating the driving-wheel, a spindle supported by the turret, a friction-wheel secured to the spindle, a threaded sleeve bearing the spindle, a shipper-nut loosely connected with the friction-wheel and in engagement with the screw-thread on the sleeve and also bearing teeth on its outer surface, a segment in engagement with the teeth on the shipper-nut, a stop-motion arm secured to the segment and bearing a roller, and a starting-pin for engaging the roller to swing the segment on its pivot, all substantially as described.

8. In a winding-machine, in combination with a winding-spindle, an expansible tip secured to the spindle, an expander having lengthwise movement within the tip, and means for automatically reciprocating the expander, all substantially as described.

9. In a winding-machine, in combination with a winding-spindle, an expansible tip secured to the spindle, an expander located within the tip, a spring thrusting the expander normally into the tip, a withdrawing-rod secured to the expander, a withdrawing-lever connected with the withdrawing-rod, and a cam for engaging the withdrawing-rod, all substantially as described.

10. In combination with the winding-spindle of a winding-machine, an expansible tip secured to the spindle, an expander thrust normally into the tip, a withdrawing-rod adjustably secured to the expander, and means for withdrawing the rod and expander, all substantially as described.

11. In a winding-machine, in combination with a winding-spindle, a friction-wheel connected therewith, a shipper-nut in engagement with the friction-wheel, a driving-wheel, a segment in engagement with the shipper-nut, a latch to engage the segment, a guide supported in operative relation to the spindle and having a movement to and from the same, and an arm connected with the guide and engaging the latch to release its hold on the segment, all substantially as described.

12. In combination in a winding-machine, a spindle, a shipper-nut connected with the spindle, a swinging segment in engagement with the shipper-nut, a latch for engaging the segment, a guide supported in operative relation to the spindle and having a movement to and from the same, a lifter-sleeve supporting the guide, an arm secured to the sleeve to engage the latch, all substantially as described.

13. In a winding-machine, in combination with a winding-spindle, a shipper-nut connected therewith, a swinging segment in engagement with the shipper-nut, a latch for engaging the segment, a guide supported in operative relation to the spindle and having a swinging movement to and from the same, a lifter-sleeve supporting the guide, an arm secured to the sleeve, and an adjustable screw borne on the arm and adapted to engage the latch to release it from its hold on the swinging arm, all substantially as described.

14. In a winding-machine, in combination, a winding-spindle, a driving-wheel, a friction-wheel connected with the winding-spindle, a shipper-nut connected with the friction-wheel, a swinging segment in engagement with the shipper-nut, and a starting-pin to engage the segment whereby the friction-wheel is thrown into engagement with the driving-wheel, all substantially as described.

15. In combination in a winding-machine, a standard or base, a turret mounted to rotate on the base, a winding-spindle borne on the turret and having an expansible tip, means for expanding the tip by the rotation of the turret, means for rotating the turret, and means for rotating the spindle, all substantially as described.

16. In combination with the winding-spindle of a winding-machine, a lifter-sleeve, a guide pivoted on the sleeve, a cam-spindle extending through the sleeve, means for rotating the cam-spindle, and a cam secured to the cam-spindle and in engagement with the guide, all substantially as described.

17. In combination with the winding-spindle of a winding-machine, a hollow lifter-sleeve, a guide pivoted to the sleeve, an arm secured to the sleeve to rotate it, a cam-spindle extending through the sleeve, means for rotating the cam-spindle, and a cam secured to the cam-spindle and in engagement with the guide, all substantially as described.

18. In combination with the winding-spindle of a winding-machine, a lifter-sleeve, a guide pivoted on the sleeve, an arm secured to the sleeve, a lifter-cam for engaging the arm, a cam-spindle extending through the sleeve, means for driving the spindle, and a cam secured to the spindle and in engagement with the guide, all substantially as described.

19. In combination with the winding-spindle of a winding-machine, a lifter-sleeve, a guide pivoted on the sleeve and in operative relation to the spindle, an arm adjustably secured to the sleeve, and a lifter-cam for engaging the arm, all substantially as described.

20. In a winding-machine, in combination, a winding-spindle, a gear secured to the winding-spindle, a cam-spindle, a gear secured to one end of the cam-spindle and in engagement with a gear on the winding-spindle, a lifter-sleeve supporting the cam-spindle, a guide pivoted on the sleeve, an arm secured to the sleeve, and a cam secured to the cam-spindle and in engagement with the guide, all substantially as described.

21. In combination with the winding-spindle of a winding-machine, a lifter-sleeve, an oscillator pivoted on the sleeve, and a guide adjustably secured to the oscillator and in operative relation to the spindle, all substantially as described.

22. In combination with the winding-spindle of a winding-machine, a lifter-sleeve, an oscillator removably secured to the sleeve, and a guide secured to the oscillator and in operative relation to the spindle, all substantially as described.

23. In combination with the winding-spindle of a winding-machine, a cutter-arm bearing a series of tube-cutters adapted to be moved into contact with the winding-spindle, a traversing arm bearing a series of thread-guides adapted to guide threads onto the winding-spindle at points lying between the several tube-cutters when the latter are in contact with the spindle, all substantially as described.

24. In combination with the winding-spindle of a winding-machine, a pivoted sleeve, a cutter-arm adjustably secured to the sleeve and bearing a series of tube-cutters in operative relation to the spindle, and a lever-arm secured to the sleeve whereby said cutters are moved toward and from the spindle, all substantially as described.

25. In combination with the winding-spindle of a winding-machine, a pivoted sleeve, a cutter-arm secured to the sleeve and bearing a series of tube-cutters in operative relation to the spindle, a lever-arm secured to the sleeve, and a cutter-cam for engaging the lever-arm, all substantially as described.

26. In combination with the winding-spindle of a winding-machine, a pivoted sleeve, a cutter-arm bearing a series of tube-cutters in operative relation to the spindle, a lever arm secured to the sleeve, and a spring-retained cam for engaging the lever-arm, all substantially as described.

27. In combination with the turret of a winding-machine bearing a winding-spindle, a quill adjustably secured to the turret, a lifter-sleeve borne in the quill, an oscillator pivoted to the sleeve, a cam-spindle extending through the sleeve, means for rotating the cam-spindle, and a cam secured to the said spindle and in operative engagement with the guide, all substantially as described.

28. In combination in a winding-machine, a cam-spindle, means for rotating the spindle, a cam secured to the spindle, a sleeve supporting the cam-spindle, an oscillator pivoted on the sleeve, and a guide adjustably secured to the oscillator, all substantially as described.

29. In combination with the winding-spindle of a winding-machine, a tube-cutter adapted to be carried into engagement with the winding-spindle, a cutter-arm connected with said cutter, and a yielding cam adapted to engage the tube-cutter, all substantially as described.

30. In combination with the spindle of a winding-machine, a sleeve, a cutter-arm bearing a series of tube-cutters in operative relation to the spindle, a lever-arm secured to the sleeve, and a yielding cam for engaging the lever-arm, all substantially as described.

31. In combination with the winding-spindle of a winding-machine, a sleeve, a cutter-arm adjustably secured to the sleeve and bearing a series of tube-cutters in operative relation to the spindle, a lever-arm and a yielding cam for engaging the lever-arm, all substantially as described.

32. In combination with the winding-spindle of a winding-machine adapted to receive a bobbin, shipping mechanism for automatically controlling the rotation of the spindle, a series of thread-guides, each guide controlling the winding of the thread on a certain section of the bobbin, a series of tube-cutters adapted to sever the bobbin-tube at points between the sections on which the winding is being done, means for operating the shipping mechanism, and means for operating the tube-cutters after the winding operation has been begun, all substantially as described.

DICKERSON G. BAKER.

Witnesses:
GEORGE W. MELONY,
FRANK LANDEN.